April 14, 1970     L. G. STRUTTMAN     3,506,832
METHODS AND APPARATUS FOR ASSAY OF RADIOACTIVE SOLUTIONS
Filed Aug. 7, 1967
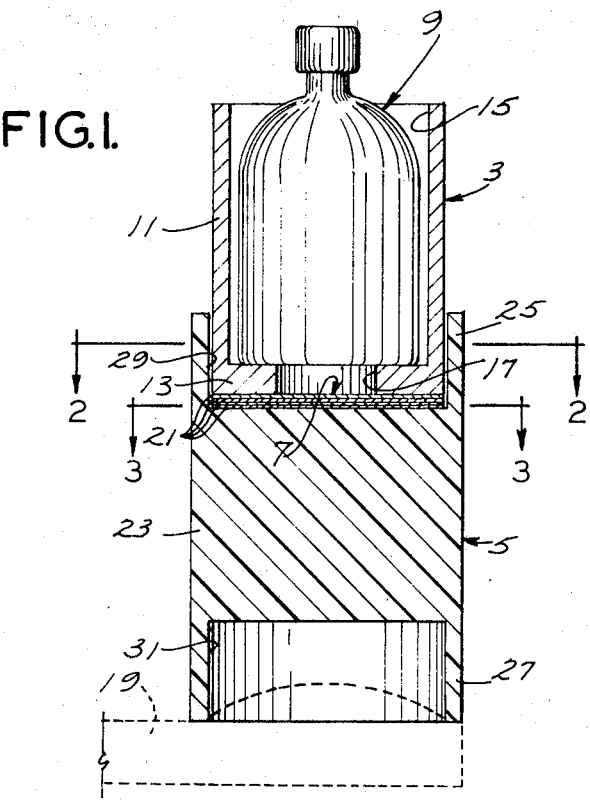
FIG. I.
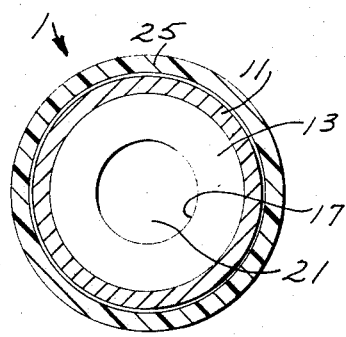
FIG. 2
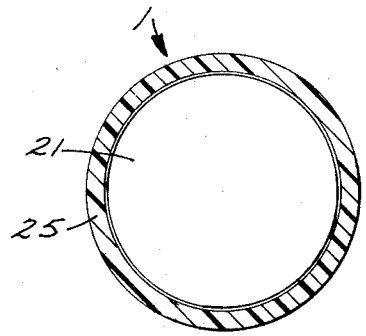
FIG. 3
Lloyd G. Struttman,
Inventor
Koenig, Senniger, Powers and Leavitt,
Attorneys.

United States Patent Office 3,506,832
Patented Apr. 14, 1970

3,506,832
METHODS AND APPARATUS FOR ASSAY OF RADIOACTIVE SOLUTIONS
Lloyd G. Struttman, St. Louis County, Mo., assignor to Mallinckrodt Chemical Works, St. Louis, Mo., a corporation of Missouri
Filed Aug. 7, 1967, Ser. No. 658,788
Int. Cl. G21f *1/00, 3/00, 5/00, 7/00*
U.S. Cl. 250—108      10 Claims

ABSTRACT OF THE DISCLOSURE

Apparatus and methods for the non-destructive assay of radioisotopes. A bottled radioisotope solution is placed in a cupped shield having an opening for collimating the emitted radiation in the direction of a radiation detector. The energy of the collimated beam is attenuated by means of one or more lead disks to the range of the detector and an associated radiospectrometer. The bottled solution, shield and filter(s) are placed in a rigid plastic block that spaces the radiation source from the detector and absorbs emitted secondary radiation. The intensity of the radiation is measured by the radiospectrometer after calibration of the latter with the apparatus and a radioisotope standard.

BACKGROUND OF THE INVENTION

This invention relates to methods and apparatus for assay of radioactive solutions, and more particularly to the measurement of emanations from radioisotopes useful, for example, in medical radiology.

Briefly, the invention is directed to methods for the non-destructive quantitative assay of radioisotopes and to apparatus useful in carrying out such methods. The invention is particularly adapted for the assay of parent and daughter radioisotopes in radiopharmaceutical solutions, such as the daughter radioisotope technetium-99m and the parent radioisotope molybdenum-99 in the eluate produced by elution of a suitable technetium-99m generator. Such radioisotopes generally have relatively short half-lives, and it is important therefore that these radioisotopes be generated or prepared in the hospital, clinic or other place of use shortly before usage. For this purpose, generator-separator apparatus, commonly referred to in the art as a "cow," have been developed. These generators are generally capable of being used with several different parent-daughter radioisotope pairs to produce several different daughter radioisotopes by elution of a parent radioisotope.

It is necessary that solutions of daughter radioisotopes for intravenous or oral use be prepared and maintained in a sterile condition, and that the content of unwanted parent radioisotope be known to be below allowable maximum limits as set by the U.S. Atomic Energy Commission. Heretofore, procedures required to accomplish this have been inconvenient, time consuming and costly. Typically, the so-called "dilution technique" has been for the assay of different radioisotopes in the presence of each other. This technique reduces the level of emitted radiation to the raage of the measuring instrument by first removing a measured sample of the solution from its original container, diluting the sample to a known volume, removing a measured volume of the diluted solution and examining the removed solution in a previously calibrated radiospectrometer.

SUMMARY OF THE INVENTION

Among the objects of this invention may be noted the provision of improved methods and apparatus for the non-destructive assay of radioisotope solutions; the provision of such methods and apparatus for the assay of parent and daughter radioisotopes in the presence of each other; the provision of methods and apparatus of the class described which avoid contamination of the radioisotope solution; the provision of such methods and apparatus which do not require removal of the solution from its container; and the propision of such methods and apparatus which are characterized by simplicity of use and low cost.

In general, apparatus of this invention for the assay of radioactive solutions in an instrument having a radiation detector comprises a shield adapted to receive a container of the solution to be assayed, the shield having an opening therein for collimating the radiation emitted from the solution. A variable attenuator covers the opening for limiting the intensity of the emitted radiation passing through the opening, and means receiving the shield and attenuator are provided for supporting the container adjacent the radiation detector. The method of this invention comprises shielding the solution to limit the quantity of emitted radiation to that traversing a path intersecting the detector, attenuating the intensity of the emitted radiation along the path to within the range of the instrument, and absorbing the secondary radiation generated during shielding and attenuation of the emitted radiation. Other objects and features will be in part apparent and in part pointed out hereinafter.

BRIEF DESCRIPTION OF THE DRAWINGS

FIG. 1 is a vertical section of the apparatus of this invention; and

FIGS. 2 and 3 are horizontal sections on lines 2—2 and 3—3 of FIG. 1, respectively.

Corresponding reference characters indicate corresponding parts throughout the several views of the drawings.

DESCRIPTION OF THE PREFERRED EMBODIMENT

Referring to the drawings, apparatus useful for assaying various radioisotope solutions is indicated generally at 1. This apparatus briefly comprises a shield 3 carried by a spacer block 5 with a radiation filter assembly 7 between the shield and block. A conventional sterile radioisotope solution container 9, e.g., a vial, is shown within the shield 3.

Shield 3 is of generally cup-shaped configuration having a cylindrical wall 11 and a flat bottom 13 defining a chamber 15, the bottom having a circular opening or hole 17 therein. The cupped shield 3 is formed of a suitable radiation absorbing material, such as lead, for protecting the technician carrying out the essay from the radiation emitted from the isotope solution in the container or vial 9. The diameter of chamber 15 is slightly greater than the diameter of container or vial 9, and the thickness of the cylindrical wall 11 is minimized so as to accomplish the intended shielding effect while maintaining the weight of the shield to a minimum. The exact thickness of the wall 11 may be determined in accordance with the intensity of the energy of the radioisotope to be assayed, the principles and methods of calculating the necessary shielding for any given radioisotope being well known to those skilled in the art. The wall 11 of shield 3 has a height somewhat less than that of the vial 9 so that the vial may be conveniently inserted into and removed from the chamber 15 by means of suitable tongs gripping the vial at its neck.

The bottom 13 of the shield is relatively thick for absorbing substantially all of the emitted radiation striking it. Thus, the quantity of radiation emitted from vial 9 is limited to that passing through the opening 17, the latter acting to collimate the radiation along a path intersecting a radiation detector, as illustrated in phantom at 19, of a conventional radiospectrometer (not shown).

The energy or intensity of the radiation transmitted through opening 17 toward the radiation detector 19 varies considerably depending upon the nature and type of radioisotope contained in vial 9. In most instances, the energy of the escaping radiation must be attenuated to bring it within the range of sensitivity of the detector and its associated radiospectrometer. This is readily achieved in the present invention by means of the radiation attenuator or filter assembly 7, which, as shown in FIG. 1, is constituted by a stack of discs 21 of a radiation absorbing material, such as lead, of various thicknesses. The disks 21 are circular, having a diameter approximately equal to the diameter of the shield, for placement between the shield 3 and block 5 across opening 17. The attenuation of filter assembly 7 is readily varied by the addition or removal of one or more of the disks, or by replacement of certain of the disks with disks of different thicknesses. Thus, the overall thickness of the filter assembly 7 may be varied to vary the intensity of the radiation transmitted through opening 17 in accordance with the radioisotope being assayed and the sensitivity and range of the radiospectrometer being used.

Attenuation of the primary radiation emanated from the radioisotope in vial 9 by means of filter assembly 7 and shield 3 normally results in the generation of a significant level of secondary radiation. This secondary radiation would be sensed by the radiospectrometer detector 19, thereby preventing accurate assay of the primary radiation emitted from the radioisotope, except that the apparatus 1 substantially eliminates this secondary radiation by means of the spacer block 5 which is formed of a material that absorbs this radiation. For example, the block may be formed of a rigid, dimensionally stable synthetic resinous material, such as polyethylene or polypropylene. Other materials may, of course, be utilized, the important considerations being that the material is dimensionally stable and an absorber of secondary radiation.

The block 5 is of cylindrical configuration having a relatively thick solid center section 23 and upper and lower thin-walled sections 25 and 27 respectively defining upper and lower recesses or chambers 29 and 31. The upper recess 29 has an inside diameter slightly larger than the diameter of the shield 3 for supporting the shield containing the radioisotope vial 9 in spaced relation to the detector 19. Similarly, the diameter of the upper chamber 29 is larger than the disks 21 for receiving one or more of the disks prior to insertion of the shield. The lower recess 31 in the block 5 is provided for stable emplacement of the apparatus 1 on the convex face of a conventional radiation detector, such as the detector 19. It should, of course, be understood that other types of conventional detectors, including those having planar faces, may be utilized with the apparatus 1.

Shield 3 of the apparatus 1, as illustrated and described, may be formed of lead with a ⅛ inch thick upper wall 11 and a ⅜ inch thick bottom 13. The collimator opening is a ¾ inch diameter hole formed in the center of the bottom of the shield, and the filter assembly 7 consists of five lead disks having thicknesses of 0.5 mm. and 1.0 mm. For example, three disks may be 0.5 mm. thick, and two may be 1.0 mm. thick. The spacer block 5 is formed of a rigid plastic material having a 2 inch outside diameter, a 3 inch height, a ¼ inch thick upper wall 25 and a ⅜ inch thick lower wall 27. The exact construction of the apparatus 1 may, of course, vary depending upon the particular radioisotope to be assayed and the type of radiospectrometer used. The above dimensions and materials, however, are exemplary of an embodiment of the invention useful for the assay of an eluate containing technetium-99m ($^{99m}$Tc) and molybdenum-99 ($^{99}$Mo) in a solution produced by the elution of $^{99}$Mo in a radioisotope generator, such as that described in U.S. patent application Ser. No. 571,466, filed Aug. 10, 1966, or Ser. No. 658,872, filed Aug. 7, 1967, both assigned to the assignee of this application.

Briefly, in the use of the apparatus 1, the radioisotope spectrometer is first checked to determine the reproducibility of its counting system by placing a radioisotope standard reference source, such as a $^{152-154}$Eu reference source, at the center of the radiospectrometer's radiation detector. Within established tolerance limits, a radioactive calibration source for the radioisotope solution to be assayed is placed in shield 3 and the shield is inserted in the recess 29 of block 5 along with three or four lead disks 21. With the spectrometer set for use with the particular calibration source being used, the number of disks is varied until a radiation intensity range convenient for use with the spectrometer is obtained. The calibration factor of the instrument is then determined by dividing the strength of the calibration source by the counts per minute recorded for it less any background counts per minute. The calibration source is then removed and the solution to be assayed is placed in the apparatus 1, and the strength or assay of radioisotope solution is determined by multiplying the counts per minute recorded for the solution by the calibration factor for the instrument.

The following examples for assay of a solution containing $^{99m}$Tc and $^{99}$Mo further illustrate the invention.

EXAMPLE 1

The apparatus 1 may be used with a rectilinear radioactivity scanner having a continuous adjustable spectrometer, such as the Picker Magnascanner, by removing the collimator from the scanner detector and positioning the detector face upward.

(1) The detector and spectrometer are calibrated by placing a 0.5 microcurie $^{152-154}$Eu reference source on the center of the scanner detector. The spectrometer is set to read 113–133 kev. and the high voltage is adjusted until a maximum counting rate is indicated on the count rate meter. The high voltage control is then locked in place.

(2) The spectrometer setting is then changed to 110–160 kev. and the net counting rate per minute (c.p.m.) of the $^{152-154}$Eu reference source is determined. This counting rate should be recorded and checked daily. If the net c.p.m. varies by more than ±2.5% on any given day, Step 1 should be repeated (over a period of time the decay of $^{152-154}$Eu must be considered). To account for decay, a standard $^{152-154}$Eu correction chart may be used to obtain the corrected net c.p.m.

(3) A 10 millicurie $^{99m}$Tc calibration standard is then placed in the shield 3.

(4) Using three lead disks 21 as the filter assembly 7, the entire apparatus 1 is placed in the space vacated by the detector's collimator.

(5) With a spectrometer setting of 110–160 kev., the c.p.m. of the $^{99m}$Tc calibration standard is determined. Then, 0.5 mm. and 1.0 mm. lead disks 21 are added to or subtracted from the filter assembly 7 to obtain a counting rate of 1000–2000 c.p.m. per millicurie (mc.) of $^{99m}$Tc. Once the proper thickness of filter assembly 7 is determined, it should not be changed or removed from the apparatus. A time constant yielding a minimum of fluctuation of the needle should be used. The c.p.m. is recorded. The linearity between the count rate scale range used for the $^{99m}$Tc calibration standard and the solution to be assayed should then be checked by counting a source of radioactivity that will give an upper third scale reading on the lower range, then switching the range selector to an upper range. The two readings should be the same. If they are not, the net $^{99m}$Tc c.p.m. in Step 7 should be corrected by multiplying it by c.p.m.-Upper Range c.p.m.-Lower Range (6) The $^{99m}$Tc calibration standard and shield 3 are then removed and the background CPM recorded.

(7) The $^{99m}$Tc calibration factor ($F^{99m}$Tc) is then calculated as follows:

$$F^{99m}Tc = \frac{\text{Strength of }^{99m}\text{Tc Calib. Standard at time of standardization}}{\text{C.p.m. of }^{99m}\text{Tc Calib. Standard—Background c.p.m.}}$$

(8) The 0.5 microcurie $^{152-154}$Eu reference source is placed on the scanner detector as in Step 1 above. The spectrometer settings are changed to 600–900 kev. and the net c.p.m. is recorded. The same counting considerations at this setting apply as described in Step 2 above.

(9) A $^{99}$Mo calibration standard is placed in shield 3 and in the assembly 1 and the c.p.m. is recorded. The linearity between the count rate scale range used for the $^{99}$Mo calibration standard and the scale range used for assaying the $^{99}$Mo in the solution to be assayed should be checked by counting a source of radioactivity that will give an upper third scale reading on the range used for the $^{99}$Mo calibration standard, then switching the range selector to the range used for the solution. The two readings should be the same. If they are not, the net $^{99}$Mo c.p.m. in Step 11 should be corrected by multiplying it by $$\frac{\text{c.p.m.-Solution Range}}{\text{c.p.m.-}^{99}\text{Mo Calib. Standard Range}}$$

(10) The $^{99}$Mo calibration standard and shield 3 are removed and the background c.p.m. is recorded.

(11) The $^{99}$Mo calibration factor ($F^{99}$Mo) is calculated as follows:

$$F^{99}Mo = \frac{\text{Strength of }^{99}\text{Mo Calib. Standard at time of standardzation}}{\text{C.m.p. of }^{99}\text{Mo Calib. Standard—Background c.p.m.}}$$

The strength of $^{99m}$Tc and of the $^{99}$Mo contamination in the solution to be assayed may now be determined as follows:

(A) Step 2 above is repeated to check spectrometer adjustments.

(B) The $^{99m}$Tc vial 9 is placed in shield 3 of the assembled apparatus as in Step 4 above.

(C) The spectrometer is set at 110–160 kev. and the CPM is determined. Assembly 1 is removed and the background CPM is determined and subtracted from sample c.p.m. The strength of $^{99m}$Tc in millicuries is calculated as follows:

$$^{99m}\text{Tc Strength (mc.)} = \text{Net c.p.m.} \times F^{99m}Tc$$

(D) The spectrometer is set at 600–900 kev. and background CPM is recorded (use low scale range).

(E) Step 8 above is repeated after removing assembly 1 from hte scanner detector.

(F) Assembly 1 is replaced on the scanner detector and the indicated c.p.m. is recorded. The strength of the $^{99}$Mo in the solution in microcuries ($\mu$c.) may be calculated as follows:

$$^{99}\text{Mo Strength }(\mu c.) = \text{Net CPM} \times F^{99}Mo$$

EXAMPLE 2

The apparatus 1 may also be used with a rectilinear radioactivity scanner having a stepped adjustable spectrometer, such as The Nuclear-Chicago Pho-Dot Scanner. The collimator of the detector is first removed and the detector is positioned so that the crystal is pointing upward, as in Example 1. Calibrate the scanner detector and spectrometer as follows:

(1) Set the Isotope Range Dial to 2 and place the assembly 1 on the center of the probe.

(2) Place three lead disks 21 in recess 29 of block 5 of the assembly 1.

(3) Place a 10 millicurie $^{99m}$Tc calibration standard and shield 3 in the block 5 and adjust the Isotope Peak Dial until a maximum count rate is obtained on the count rate (c.r.) meter. Record the c.p.m. indicated on the c.r. meter. An ideal c.p.m. is between 500–1000 per mc. of $^{99m}$Tc. Add or subtract 0.5 mm. and 1.0 mm. lead disks 21 in the filter assembly 7 until this c.p.m. is obtained. Once the proper amount of attenuation is determined, the lead disks should be left in the assembly 1 and not removed. Record the setting of the Isotope Peak Dial and check for agreement between the scales as in Step 5 of Example 1.

(4) The $^{99m}$Tc calibration factor ($F^{99m}$Tc) is calculated as follows:

$$F^{99m}Tc = \frac{\text{Strength of }^{99m}\text{Tc Calib. Standard (mc.) at time of standardization}}{\text{C.p.m. of }^{99m}\text{Tc Calib. Standard—Background c.p.m.}}$$

(5) Remove the assembly 1 and place a $^{152-154}$Eu reference source (see Example 1) on the scanner detector. Determine and record the c.p.m. indicated on the c.r. meter. The purpose of the $^{152-154}$Eu check is to determine the reproducibility of the counting system. As long as the c.p.m. of the $^{152-154}$Eu reference source, as determined in Steps C and I below, does not vary by more than $\pm 2.5\%$ (with decay considered) from one day to the next, the $F^{99m}$Tc and $F^{99}$Mo factors can be assumed to be constant and need not be redetermined.

(6) Remove the $^{152-154}$Eu reference source and replace with the assembly 1 containing a 10 microcurie $^{99}$Mo calibration standard.

(7) Set the Isotope Range Dial to 3 and adjust the Isotope Peak Dial until a maximum counting rate is obtained. Record the indicated c.p.m. and the setting of the Isotope Peak Dial. Check for agreement between the scales as in Step 9 of Example 1.

(8) Remove the $^{99}$Mo calibration standard and shield 3 from the assembly 1 and record the indicated c.p.m. as background.

(9) Repeat Step 5 above at this setting.

(10) The $^{99}$Mo calibration factor ($F^{99}$Mo) is calculated as follows:

$$F^{99}Mo = \frac{\text{Strength of }^{99}\text{Mo Calib. Standard }(\mu c.)\text{ at time of standardization}}{\text{C.p.m. of }^{99}\text{Mo Calib. Standard—Background c.p.m.}}$$

After the scanner and spectrometer have been standardized by the above procedure, a solution may be assayed for $^{99m}$Tc and $^{99}$Mo as follows:

(A) Place $^{99m}$Tc vial in shield 3 of the assembly 1.

(B) With the Isotope Range at 2, set the Isotope Peak Dial at the setting determined in Step 3 above and record the indicated c.p.m.

(C) Determine and record the $^{152-154}$Eu reference source net c.p.m. as described in Step 5 above and compare with c.p.m. obtained in that step.

(D) Remove $^{152-154}$Eu reference source and place the assembly 1 on the detector scanner. Record the indicated c.p.m. as background.

(E) Calculate the strength of the $^{99m}$Tc in the vial in millicuries as follows:

$$^{99m}\text{Tc Strength (mc.)} = \text{Net c.p.m.} \times F^{99m}Tc$$

(F) Change the Isotope Range to 3 and set the Isotope Peak Dial to the setting determined in Step 7. Place the shield 3 and vial 9 in the assembly 1 and record the indicated c.p.m.

(G) Remove the shield 3 and record indicated c.p.m. as background.

(H) Remove the assembly 1 and place the $^{152-154}$Eu reference source on the detector scanner.

(I) Determine the net c.p.m. at this spectrometer setting as described in Step 5 above and compare with c.p.m. obtained in Step 9.

(J) Calculate the strength of the $^{99}$Mo in the vial 9 in microcuries as follows:

$$\text{Strength }^{99}\text{Mo }(\mu c.) = \text{Net c.p.m.} \times F^{99}Mo$$

In determining c.p.m. of all sources, a scale range which yields sufficient use of the meter, e.g., c.p.m.=8000 use 10K scale range, should be used.

Thus, the apparatus and methods of this invention provide for the simplified assay of radioactive solutions without necessitating removal and dilution of a portion thereof. The intensity of the radioactive emissions from the solution are readily attenuated to the range of the spectrometer being used, and interfering secondary radiation is eliminated. In addition, accurate assay is insured since the calibration standard and assay solution are identically positioned with respect to the spectrometer detector during calibration and assay. The apparatus is further characterized by simplicity of construction, low cost and ease of use.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawing shall be interpreted as illustrative and not in a limiting sense.

What is claimed is:

1. Apparatus for the assay of radioactive solutions in an instrument having a radiation detector, said apparatus comprising a shield adapted to receive a container of the solution to be assayed, the shield having an opening therein for collimating the radiation emitted from the solution, a variable attenuator covering said opening for limiting the intensity of the emitted radiation passing therethrough, and means receiving said shield and attenuator for supporting the container adjacent the radiation detector, comprising a block of secondary radiation absorbing material having a recess at one end for receiving said shield and attenuator.

2. Apparatus as set forth in claim 1 wherein said variable attenuator comprises a plurality of lead disks, one or more of said disks being selectively disposed across said opening for limiting the intensity of the emitted radiation to the range of the instrument being used.

3. Apparatus as set forth in claim 2 wherein said disks are of different thicknesses.

4. Apparatus as set forth in claim 1 wherein said material is a rigid, dimensionally stable synethetic resin.

5. Apparatus as set forth in claim 1 wherein the block has a second recess in the other end thereof for placement of the block on a detector having a convex face with the convex face received in the second recess.

6. Apparatus as set forth in claim 1 wherein said shield is a lead cup and the opening is formed in the bottom thereof, and said means comprises a block having a recess at its upper end, the block receiving the attenuator at the bottom of said recess and the cup in the recess on the attenuator.

7. Apparatus for the assay of radio-active solutions comprising a block formed of a secondary radiation absorbing material and having a recess in its upper end, a plurality of lead disks carried by the block at the bottom of the recess, and a cup-shaped lead shield having a collimating opening in its bottom, said shield being received in the recess on the lead disks with the disks extending across the opening, said shield being adapted to receive a container of the solution to be assayed in said recess on the disks.

8. The method of assaying the radioactive emissions of a radioactive solution in an instrument having a radiation detector comprising shielding the solution to limit the quantity of emitted radiation to that traversing a path intersecting the detector, attenuating the intensity of the emitted radiation along said path to within the range of the instrument, and absorbing secondary radiation generated during shielding and attenuation of the emitted radiation.

9. The method of claim 8 wherein the emitted radiation is attenuated to within the range of the instrument by varying the thickness of an attenuator interposed in said path.

10. The method of claim 9 wherein the emitted radiation is attenuated to within the range of the instrument by use of one or more layers of radiation-absorbing material.

References Cited
UNITED STATES PATENTS

| | | | |
|---|---|---|---|
| 2,769,916 | 11/1956 | Tittle | 250—108 X |
| 2,978,587 | 4/1961 | Forro | 250—108 X |
| 3,072,793 | 1/1963 | Hall | 250—108 X |
| 3,183,354 | 5/1965 | Amrehn. | |

ARCHIE R. BORCHELT, Primary Examiner

U.S. Cl. X.R.

250—83, 86